T. J. CROWE.
SPRING WHEEL.
APPLICATION FILED OCT. 23, 1915.

1,229,892.

Patented June 12, 1917.
3 SHEETS—SHEET 1.

Witnesses

Inventor
T. J. Crowe,
By Victor J. Evans
Attorney

T. J. CROWE.
SPRING WHEEL.
APPLICATION FILED OCT. 23, 1915.
1,229,892.
Patented June 12, 1917.
3 SHEETS—SHEET 2.
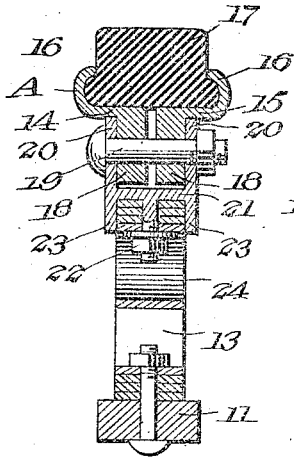
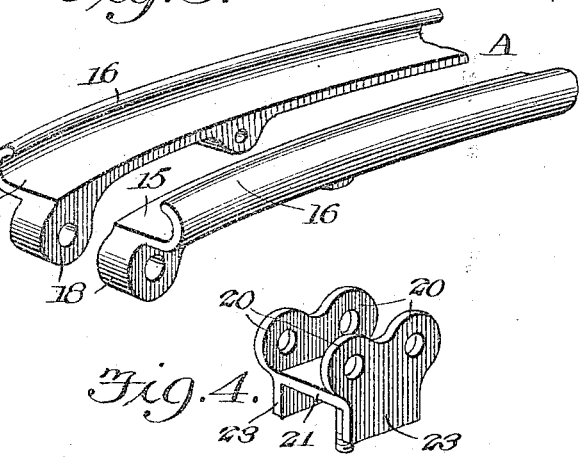
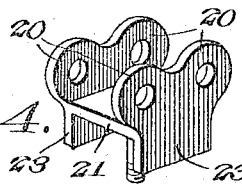
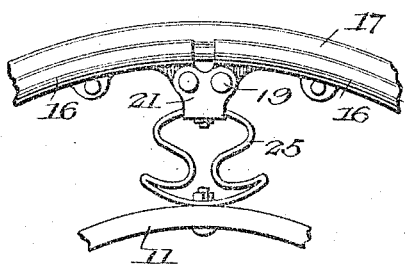
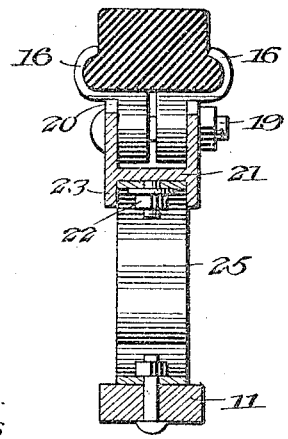
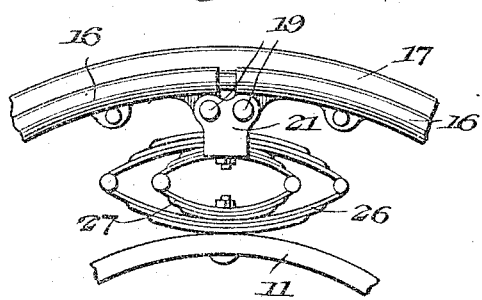
Witnesses
Inventor
T. J. Crowe,
By Victor J. Evans
Attorney

T. J. CROWE.
SPRING WHEEL.
APPLICATION FILED OCT. 23, 1915.

1,229,892.

Patented June 12, 1917.
3 SHEETS—SHEET 3.

Witnesses
Hugh H. Ott

Inventor
T. J. Crowe,
By Victor J. Evans
Attorney

UNITED STATES PATENT OFFICE.

THOMAS J. CROWE, OF DALLAS, TEXAS.

SPRING-WHEEL.

1,229,892.   Specification of Letters Patent.   Patented June 12, 1917.

Application filed October 23, 1915. Serial No. 57,501.

*To all whom it may concern:*

Be it known that I, THOMAS J. CROWE, a citizen of the United States, residing at Dallas, in the county of Dallas and State of Texas, have invented new and useful Improvements in Spring-Wheels, of which the following is a specification.

The invention relates to vehicle wheels, and more particularly to the class of spring wheels.

The primary object of the invention is the provision of a spring wheel which is especially useful for automobiles, and other vehicles, such as motorcycles and motor trucks, the construction of which will dispense with the necessity of using a pneumatic tire, and at the same time supply the required resiliency for absorbing shocks and jars incident to the travel of such wheel, and also to prevent the transmission of the said shocks and jars to the axle and body of the vehicle.

Another object of the invention is the provision of a spring wheel wherein the construction thereof is an improvement over the subject matter of Patent No. 1,094,308, issued to me on or about the 21st day of April, 1914.

A further object of the invention is the provision of a spring wheel wherein the periphery thereof is made up of a plurality of pivotally connected sections which have a play relatively to each other and to the hub of the wheel, thereby giving the required elasticity and yieldability to the wheel for absorbing all jars and vibrations, the springs and the said pivotal sections being united in a novel manner to prevent lateral play when the wheel is in use.

A still further object of the invention is the provision of a wheel of this character which obviates punctures, blow outs and other tire troubles, yet possesses the qualities of a pneumatic tire.

A still further object of the invention is the provision of a wheel of this character which is simple in construction, reliable and efficient in use, strong, durable, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawings:—

Fig. 3 is a vertical transverse sectional view.

Fig. 4 is a perspective view of one of the clips used in the wheel.

Fig. 5 is a perspective view of one of the peripheral sections of the wheel.

Fig. 6 is a fragmentary side elevation of a modification in the invention.

Fig. 7 is a vertical transverse sectional view thereof.

Fig. 8 is a fragmentary side elevation of a further modification.

Similar reference characters indicate corresponding parts throughout the several views in the drawings.

Figure 1:
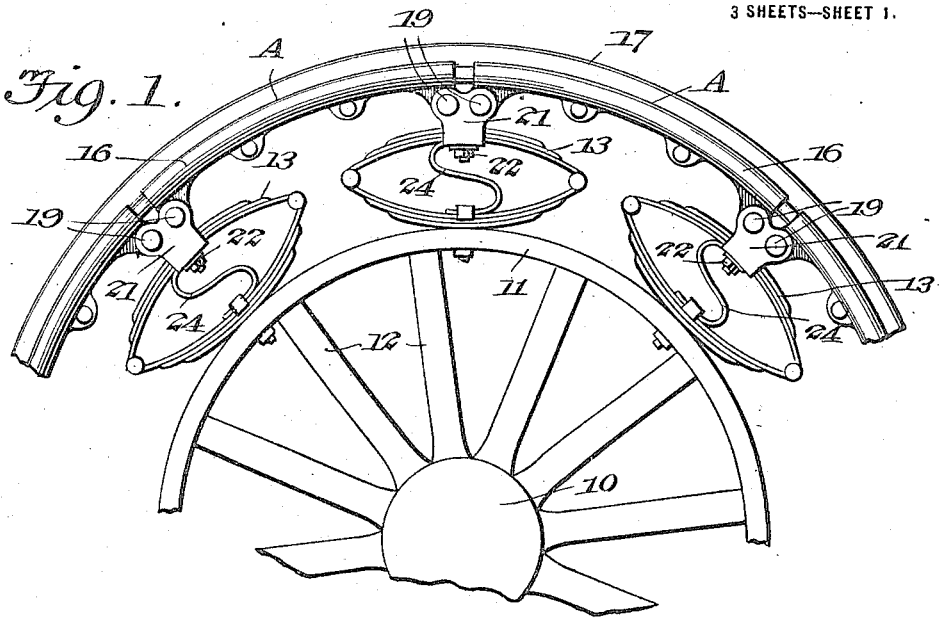
Figure 1 is a fragmentary side elevation of a wheel constructed in accordance with the invention.
Figure 2:
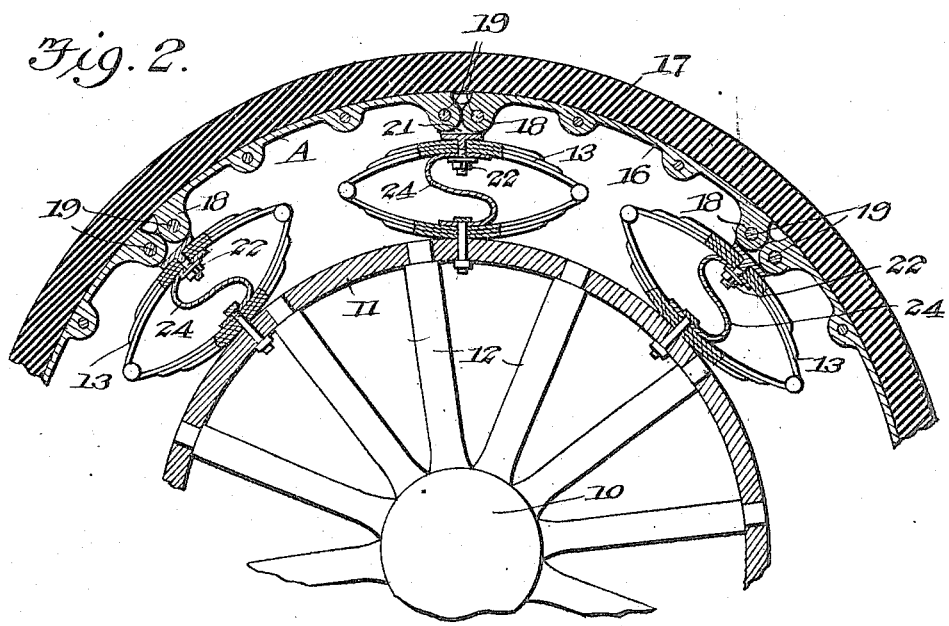
Fig. 2 is a fragmentary longitudinal sectional view therethrough.

Referring to the drawings in detail, the spring wheel contemplated in this invention embodies a hub 10, an inner fixed felly 11, spokes 12 connecting the hub rigidly with the said felly, while connected at intervals to the latter are the elliptical shaped springs 13 for yieldably supporting an outer flexible rim hereinafter fully described.

The outer flexible rim comprises a circular series of sections A, each formed in two parts 14 and 15, respectively, which are similar to each other and provided at their outer sides with clencher flanges 16 for receiving the cushion tire 17, each part of the respective sections at opposite ends being formed with perforated ears or eyes 18 for receiving transverse bolt members 19 which are also passed through the side ears 20 of a T-shaped clip 21, the stem of each being passed through the outwardly bowed plies of the elliptical spring 13 centrally thereof, and carries a lock nut 22 for securing the clip thereto. Each clip has its side ears 20 formed with inwardly directed lugs 23 which engage opposite sides of the outer stretch of the elliptical spring 13 to prevent the twisting of the latter or any sidewise movement of the clip thereon. The bolt members 19 pivotally connect the sections to each other and also to the elliptical springs 13 concentrically about the felly 11 of the wheel.

Mounted within each elliptical spring 13 centrally thereof is a substantially S-shaped auxiliary spring 24 which is fastened in place by the stem of the clip 21 and the fastener for connecting the said elliptical spring to the felly 11 of the wheel.

The parts 14 and 15 of each section can be readily adjusted laterally for accommodating the cushion tire 17 to securely fasten the same in the sections of the rim.

In Fig. 6 there is shown a slight modification of spring wheel wherein in lieu of the elliptical spring and the S-shaped spring 24 there is employed the double looped spring 25, the same being fastened between the felly and the outer rim in the manner as hereinbefore set forth.

In Fig. 8 there is shown a still further modification of spring wheel wherein in lieu of the springs hereinbefore set forth are substituted the large and small elliptical shaped springs 26 and 27 respectively, the spring 27 being fitted within the spring 26 as shown, and are fastened in a manner hereinbefore set forth.

Figure 9:
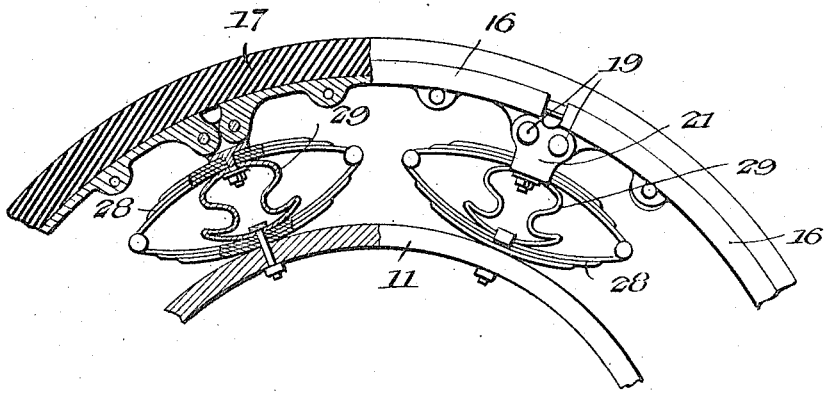
Fig. 9 is a side elevation partly in section of a still further modification.

In Fig. 9 there is shown a still further modification, wherein there is employed the elliptical shaped spring 28 and the double loop formation of spring 29, the latter being fitted within the said spring 28, and are fastened together as hereinbefore set forth.

Figure 10:
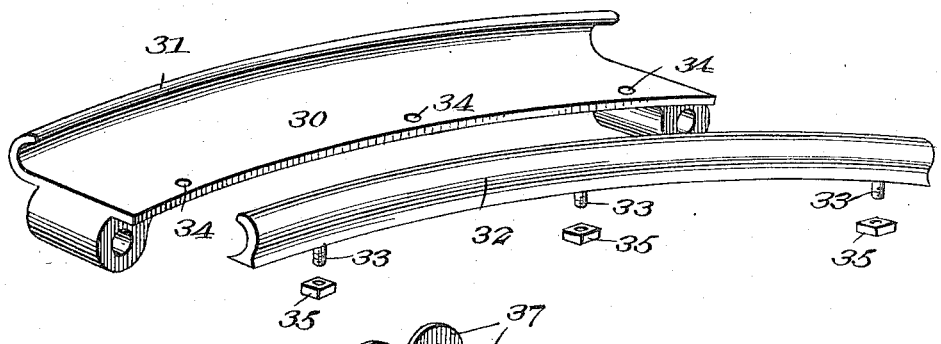
Fig. 10 is a perspective view of a modified form of one of the peripheral sections of the wheel showing the parts separated.

In Fig. 10 of the drawings there is shown a modified form of one of the peripheral pivotal sections of the outer rim, which comprises the part 30 having the integral clencher flange 31 and the separable clencher flange 32 which is formed at intervals with threaded lugs 33, the same being adapted to enter holes 34 in the parts 30 and carry nuts 35 for the fastening of the flange 32 on the said part 30, and in this manner the cushion tire is secured to the section of the outer rim.

Figure 11:
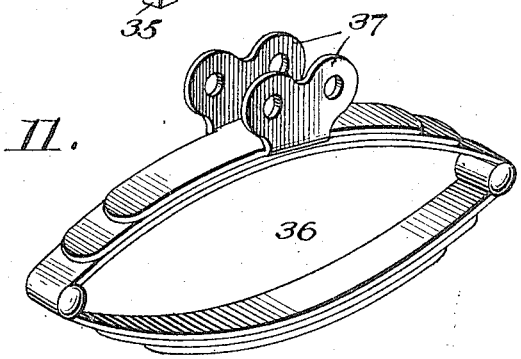
Fig. 11 is a fragmentary perspective view of a modified form of spring for the wheel.

In Fig. 11 there is shown a modified form of elliptical spring 36 which has integrally formed therewith at its outer stretch medially of the same the spaced perforated ears 37 through which are passed suitable bolt members for pivotally connecting the outer rim sections to the springs and also pivotally connecting the said rim sections together.

From the foregoing description, taken in connection with the accompanying drawings, the construction of the device will be clearly understood, and therefore a more extended explanation has been omitted.

What is claimed is:—

In a spring wheel, a rigid inner felly, springs mounted upon the felly at intervals thereof, U-shaped clips supported upon the springs and having bolt extensions passed through the springs, nuts on the bolt extensions for securing the same in the springs, an outer flexible rim formed from a plurality of sectors, each made in two parts, pivot ears at the ends of the two parts of each sector and engaged in the U-shaped clips, pivots passed through the U-shaped clips and ears, and wings formed on the clips and overlapping opposite sides of the springs to hold the springs in circumferential alinement with each other.

In testimony whereof I affix my signature in presence of two witnesses.

THOMAS J. CROWE.

Witnesses:
 Mrs. L. I. Barron,
 Grace Bennett.

Copies of this patent may be obtained for five cents each, by addressing the "Commissioner of Patents, Washington, D. C."